Figure 1:
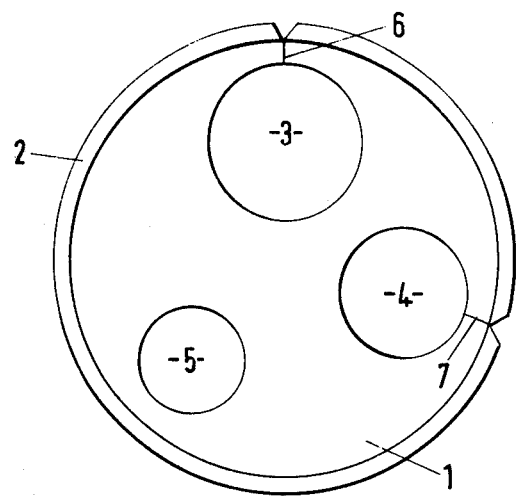

United States Patent

Parr

[11] 4,064,216
[45] Dec. 20, 1977

[54] METHOD OF RESEALING A CABLE JOINT

[75] Inventor: David Turner Parr, Croft, near Warrington, England

[73] Assignee: BICC Limited, London, England

[21] Appl. No.: 669,331

[22] Filed: Mar. 22, 1976

[51] Int. Cl.² .......................... B29C 5/00; B29F 1/00
[52] U.S. Cl. ..................................... 264/263; 29/628;
  29/630 F; 29/757; 156/49; 264/272; 264/279;
  264/329
[58] Field of Search ................. 174/93, 77 R; 156/49,
  156/242, 245, 303.1; 29/203 S, 527.1–527.4,
  628, 630 F, 757; 264/36, 37, 259, 261–263, 265,
  271, 272, 275, 328, 329, 245, 279; 339/103 B

[56] References Cited

U.S. PATENT DOCUMENTS

| | | | |
|---|---|---|---|
| 2,716,623 | 8/1955 | Tator | 264/263 |
| 2,881,241 | 4/1959 | Stecher | 174/77 R |
| 3,054,847 | 9/1962 | Colbert | 29/628 |
| 3,449,507 | 6/1969 | Channell | 174/77 R |
| 3,793,116 | 2/1974 | Schelkmann | 264/36 |
| 3,796,823 | 3/1974 | Wright et al. | 174/77 R |

*Primary Examiner*—Willard E. Hoag

*Attorney, Agent, or Firm*—Buell, Blenko & Ziesenheim

[57] ABSTRACT

In a method of making a connection between a plastics sheathed cable and an enclosed cable joint or termination, the enclosure is opened up to expose the existing conductor joint or termination and a separately formed plastics part of the enclosure that includes an end wall is removed. A new part of plastics material including an end wall which has at least one hole of a size appropriate to a cable at said end of the existing joint or termination and which is split between said hole and the peripheral edge of said new part, is applied to the or each cable sheath at said end of the joint or termination. A length of said plastics sheathed cable is passed through a further hole in the end wall of said new part and its conductor or conductors connected to at least one conductor of at least one of the cables of the existing joint or termination. The split in said new part is sealed by enclosing the edges bounding the split in a mould and injecting mouldable thermoplastics material therein, fluid-tight seals are effected between the or each cable and the end wall of said new part of the enclosure, and the enclosure is then re-closed.

16 Claims, 4 Drawing Figures

METHOD OF RESEALING A CABLE JOINT

This invention relates to jointing or terminating electric cables and is particularly concerned with electric cable joints or terminations of the kind in which connections between the cable conductors or the terminated end of the or each cable conductor are or is surrounded by a joint or termination enclosure that makes a fluid-tight joint with the sheath, insulation or other covering of each cable connected at the joint or of the or each cable at the termination. The sheath, insulation or other covering of a cable with which an enclosure makes a fluid-tight joint is hereinafter included in the term "sheath."

In some circumstances it is necessary to connect a cable to an existing joint between at least two cables, or to an existing termination of a cable, for example in a local telephone cable network where it is required to connect an additional cable to an existing telephone cable installation, and the present invention provides an improved method of making a connection between a plastics sheathed cable and a cable joint or termination of the kind in which connections between the cable conductors or the terminated end of the or each cable conductor are or is surrounded by a joint or termination enclosure divided transversely of the axis of at least one of the cables into at least two separately formed parts secured together in a fluid-tight manner, at least one of said separately formed parts being of plastics material and having or forming an end wall sealed in a fluid-tight manner to the plastics sheath of the cable or of at least one or the cables protruding into the enclosure through a hole in said end wall.

In the method according to the invention the joint or termination enclosure is opened up to expose the existing conductor joint or termination and at least said separately formed plastics part having or forming said end wall is removed; a new part of plastics material having or forming an end wall which may be of greater area than said original end wall, which has a hole or holes of a size appropriate to the cable or cables at said end of the existing joint or temination and which is split between said hole or each of said holes and the peripheral edge of said new part, is applied to the or each cable sheath at said end of the joint or termination; a length of the additional cable is passed through a further hole in the end wall of said new part and its conductor or conductors is or are connected to a conductor or conductors of one or more of the cables of the existing joint or termination; the or each split in said new part is sealed; fluid-tight seals are effected between the or each cable and the end wall of said new part of the enclosure and between the length of additional cable and the end wall of said new part; and the enclosure is then re-closed.

It will be appreciated that after said separately formed plastics part having or forming said end wall has been removed, the steps carried out in applying the new part having or forming an end wall to the or each cable sheath, introducing and jointing a length of additional cable, sealing the end wall and reclosing the enclosure may be effected in any sequence convenient to a particular joint or termination.

The further hole in the end wall of the new part of the joint or termination enclosure is preferably preformed but it may be cut or otherwise formed in said end wall to form a cable entry of a size appropriate to the additional cable after the new part has been applied to the cable or cables of the existing joint or termination.

The method of the present invention is especially, but not exclusively, suitable for use where the addition of one or more than one cable to an existing joint or termination will mean that the enclosure of the existing joint or termination is no longer of sufficient volume to house all the conductor joints. Generally, but not necessarily, both or all parts of the enclosure will be removed when the enclosure is opened up and will be replaced by corresponding parts of such a shape and size that the enclosure formed therefrom will be of larger cross-sectional area.

Preferably the edges of the new part of the enclosure bounding the or each split are chamfered or otherwise shaped to define along the split a groove, preferably of substantially v-shaped cross-section. Sealing of the or each split after the new part of the enclosure has been applied to the existing cable or cables is effected preferably by enclosing the edges bounding the split in a mould which has ports for the admission and discharge of molten thermoplastics material, injecting into the interior of the mould through at least one port molten thermoplastics material that is compatible with the plastics material of the new part of the enclosure and that is at a temperature appreciably above the softening point of said material and, after a sufficient quantity of molten thermoplastics material has passed through the mould and out of at least one other port of the mould to soften the surfaces of said edges, sealing the mould, and permitting or causing the molten thermoplastics material in the mould to cool and make an effective bond between said edges of the new part.

Preferably after sealing the mould the volume of the sealed space within the mould is reduced, for instance by means of a plunger connected to at least one of the ports in the mould, to compensate for contraction of the thermoplastics material on cooling. In some cases the source of supply can be used for this purpose but preferably the source of supply of molten thermoplastics material is disconnected from the mould before the mould is sealed.

By a plastics material that is compatible with the plastics material of the new part of the enclosure is meant a material that will make an effective bond with, and will not have any deleterious effect on, the material of the new part of the enclosure, or vice versa.

Preferably the end wall of the new part is of planar form and preferably lies in a plane that will be normal to the axis of a cable passing through a hole in the end wall.

The mould employed in sealing the or each split in the new part of the enclosure preferably comprises a body which has a surface of a shaped and configuration complementary to those of that portion of the periphery of the new part of the enclosure adjacent to the edges bounding the split and which has in said surface a groove that will overlie the edges bounding the split throughout the length of the new part when the mould is applied. Preferably the mould has two ports for the admission and discharge of molten thermoplastics material, one at each end of the groove. To prevent collapse of the new part of the enclosure during the injection welding operation, preferably a substantially rigid body is positioned against the internal surface of the new part of the enclosure in the vicinity of the split. The mould, which is preferably made of metal or metal alloy or of suitable plastics material, may be secured to the new part in any convenient manner.

Where there are two or more splits in the new part of the enclosure preferably the splits are arranged to be of substantially the same length in a direction transverse to the axes of the cables so that the same mould can be used when sealing each split.

Where the or each existing cable and the additional cable has a sheath of thermoplastics material the fluid-tight seal between the or each existing cable or the additional cable and the new part of the enclosure is preferably effected by the method described and claimed in our co-pending application Ser. No. 669,330, filed Mar. 22, 1976. In this method there is assembled about the cable adjacent a surface, preferably the outer surfae, of the new part a mould which embraces the cable and has ports for the admission and discharge of molten thermoplastics material and which is clamped or otherwise temporarily secured to the new part. Molten thermoplastics material that is identical or compatible with the plastics materials of the cable sheath and of the new part of the enclosure and that is at a temperature appreciably above the melting point of said materials is injected into the interior of the mould through said admission port and, after a sufficient quantity of molten thermoplastics material has passed through the mould and out of the discharge port to soften the surfaces of the cable sheath and of the new part of the enclosure, the mould is sealed, and is permitted or caused to cool and make an effective bond with the cable sheath and with the new part of the enclosure.

Where, as is preferred, the joint or termination enclosure is divided transversely into at least three separately formed parts, preferably the enclosure is re-closed by the method described in our co-pending application Ser. No. 683,957, filed May 6, 1976. In this method the separately formed central part, or at least one separately formed intermediate part, of the enclosure is formed by applying about the cable or cables a sleeve which comprises a single tubular body slit throughout its length or which is longitudinally divided into at least two separately formed bodies, causing the or each adjacent pair of longitudinal edges of the sleeve to abut or lie close together, enclosing the or each pair of longitudinal edges in a mould which has ports for the admission and discharge of molten thermoplastics material, injecting into the interior of the mould through at least one port molten thermoplastics material that is identical or compatible with the plastics material of the sleeve and that is at a temperature appreciably above the softening point of said material and, after sufficient quantity of molten thermoplastics material has passed through the mould to soften the surfaces of said longitudinal edges, sealing the mould, and permitting or causing the molten thermoplastics material in the mould to cool and make an effective bond between said longitudinal edges of the sleeve. The sleeve so formed is then sealed to the adjacent separately formed parts of the joint or termination enclosure.

The invention also includes, for use in the method hereinbefore described, a kit of parts comprising a separately formed plastics part of a joint or termination enclosure having or forming an end wall of the enclosure, which end wall has a hole or holes for accommodating a cable or cables and which is split between said hole or each of some or all of said holes and the peripheral edge of said part and, associated with said separately formed plastics part of the enclosure, a mould comprising a body which has a surface of a shape and configuration complementary to those of that portion of the periphery of said part of the enclosure adjacent the edges bounding the split or one of the splits, which has in said surface a groove that will overlie the edges bounding the split throughout their length when the mould is applied to said plastics part and which has ports associated with the groove for the admission and discharge of molten thermoplastics material.

Figure 2:
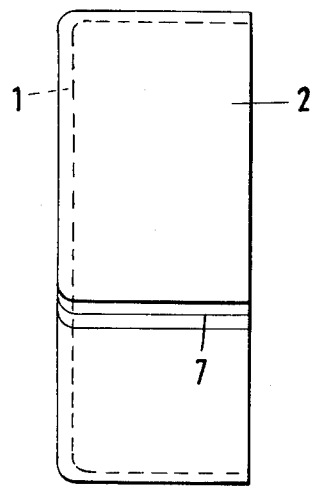
Figure 3:
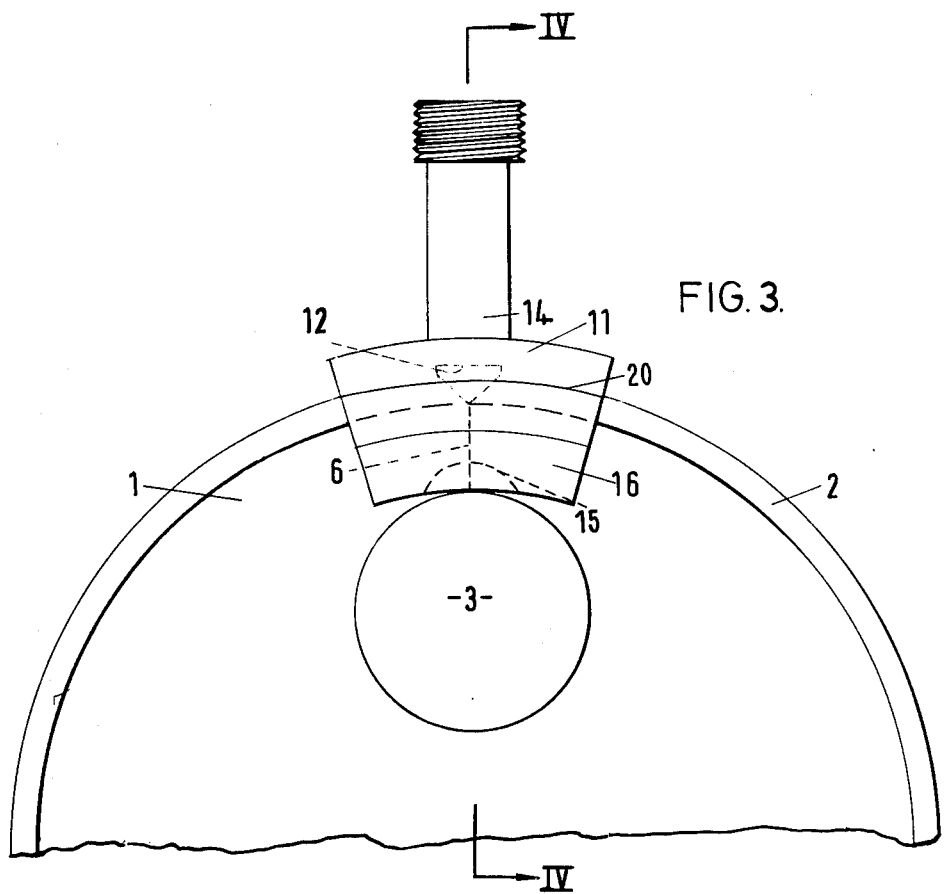
Figure 4:
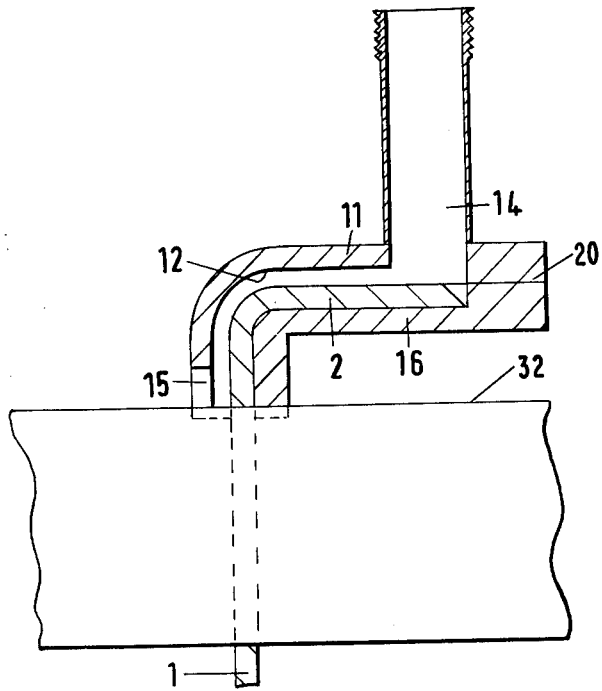

The invention is further illustrated by a description, by way of example, of the preferred method of connecting an additional telephone cable to an existing joint between plastics sheathed telephone cables with reference to the accompanying drawings, in which:

FIGS. 1 and 2, respectively, are end and side views of a new end part of a joint enclosure, and FIGS. 3 and 4, respectively, are an end view and a sectional side view taken, on the line IV — IV in FIG. 3, of a preferred mould for sealing each split in the new end part of the enclosure.

The existing joint between plastics sheathed telephone cables is housed in a joint enclosure of thermoplastics material which is divided transversely of the cable axes into three separately formed parts consisting of two end parts sealed to the plastics sheaths of the jointed cables and a central sleeve extending between and sealed to the end parts. In order to connect the additional telephone cable to the existing joint the seals between the central sleeve and the end parts and between the end parts and the plastics sheaths of the jointed cables are broken and the sleeve and end parts are removed.

At the end of the joint where the additional telephone cable is to be introduced to the joint the end part of the joint enclosure is replaced by a new end part of plastics material, as shown in FIGS. 1 and 2, which comprises an end wall 1 of greater area than that of the original end part and a circumferential wall 2 and which has, in its end wall, two holes 3 and 4, for the existing cables and a hole 5 for the additional cable. Extending from the holes 3 and 4, respectively, to the peripheral edge of the new part are splits 6 and 7 of substantially the same length whose boundary edges are chamfered to form between them grooves of substantially V-shaped cross-section. In applying the new end part, the existing cables (not shown except for cable 3a in hole 3 of FIG. 4) are introduced into the holes 3 and 4 by separating the boundary edges of the splits 6 and 7 to allow access of the cables. The additional cable is passed through the hole 5 and the conductors of the additional cable are connected to jointed conductors at the joint.

The boundary edges of each of the splits 6 and 7 are now sealed using the mould as illustrated in FIGS. 3 and 4. The mould comprises a substantially L-shaped metal body 11 having extending throughout the length of its internal surface a groove 12 at one end of which is an inlet port 14 and at the other end of which is an outlet port 15. The internal surface of the L-shaped body 11 is of a shape and configuration complementary to those of the periphery of the circumferential wall 2 of the new end part so that, when applied to the new end part, the body 11 seats on the circumferential wall with its groove 12 overlying, say, the split 6. Bearing against the internal surface of the new end part in the region of the split 6 is a substantially rigid L-shaped body 16 which serves to prevent collapse of the new end part during the subsequent injection welding operation. The mould 11 and substantially rigid body 16 may be secured together along line 20, and to the new end part, by any convenient means (not shown).

Molten thermoplastics material that is identical with the plastics material of the new end part and that is at a temperature appreciably above the softening point of said material iis now injected into the interior of the mould 11 through the inlet port 14 and, after a sufficient quantity of molten thermoplastics material has passed through the mould and out of the outlet port 15 to soften the surfaces of the edges bounding the split 6, the source of supply of molten thermoplastics material is disconnected from the mould. Plungers (not shown) are noew secured to the ports 14 and 15 and the molten thermoplastics material in the mould is permitted to cool to make an effective joint between the boundary edges of the split 6, the volume of the mould gradually being reduced by means of the plungers during the cooling period to compensate for contraction of the thermoplastics material on cooling. Alternatively, a plunger used to force molten thermoplastics material into the mould may be used to reduce the volume of the mould.

A fluid-tight seal is now effected between the new end part of the enclosure and each existing cable and the additional cable passing through the hole in the end wall 1 by injection welding of molten thermoplastics material using an appropriately designed mould, such as that described and claimed in our copending Application Ser. No. 669,330, filed Mar. 22, 1976.

At the other end of the joint a new end part, having and end wall of an area similar to that of the new end part shown in FIGS. 1 and 2, is applied to the existing cable or cables at that end of the joint in a similar manner to that described with reference to FIGS. 1 to 4.

The enclosure is now re-closed by the method described in our copending Application Ser. No. 683,957, filed May 6, 1976. In this method a sleeve which comprises a single tubular body slit throughout its length is applied about the cables at a position spaced from the joint and the adjacent pair of longitudinal edges of the sleeve are caused to abut. The pair of longtudinal edges is enclosed in a mould which has ports for the admission and discharge of molten thermoplastics material and molten thermoplastics material that is identical with the plastics material of the sleeve and that is at a temperature appreciably above the softening point of said material is injected into the interior of the mould through at least one port. After a sufficient quantity of molten thermoplastics material has passed through the mould and out of at least one other port of the mould to soften the surfaces of said longitudinal edges, the mould is sealed and the molten thermoplastics material in the mould is permitted to cool and make an effective bond between said longitudinal edges of the sleeve. The sleeve so formed is then passed over the central part of the joint so that at its ends it overlies the new end parts of the enclosure and the sleeve is then sealed to the new end parts by the injection welding technique.

What I claim as my invention is:

1. In a method of making a connection between a plastics sheathed cable comprising at least one conductor and an existing cable joint of a kind in which connections between the conductors of at least two cables are surrounded by an enclosure divided transversely of the axis of at least one of the cables into at least two separately formed parts secured together in a fluid-tight manner, at least one of said separately formed parts being of plastics material and including an end wall sealed in a fluid-tight manner to the plastics sheath of at last one cable protruding into the enclosure through a hole in said end wall at one end of said joint, the steps comprising:
 a. opening up the enclosure to expose the existing conductor joint and removing at least said separately formed plastics part including said end wall;
 b. applying to the cable sheath at said end of the joint a new part of heat softenable plastics material including and end wall which has at least one hole of a size appropriate to a cable at said end of the existing joint and having a split between said hole and a peripheral edge of said new part;
 c. passing a length of said plastics sheathed cable through a further hole in the end wall of said new part and connecting its conductor or conductors to at least one conductor of at least one of the cables of the existing joint;
 d. applying about a peripheral portion of said new part a mould enclosing only the split and portions of said new part adjacent said split, said mould having ports for the admission and discharge of molten thermoplastics material;
 e. injecting molten thermoplastics material into the interior of the mould through at least one port, which thermoplastics material is compatible with the plastics material of the new part of the enclosure and is at a temperature apprecialby above the softening point of said material;
 f. after a sufficient quantity of molten thermoplastics material has passed through the mould and out of at least one other port of the mould to soften surfaces of said edges, sealing the mould;
 g. cooling the molten thermoplastics material in he mould forming an effective bond between said edges of the new part;
 h. effecting fluid-tight seals between each cable and the end wall of said new part of the enclosure;
 i. and re-closing the enclosure.

2. A method as claimed in claim 1, wherein the source of supply of molten thermoplastics material is disconnected from the mould before the mould is sealed.

3. A method as claimed in claim 1, in which the new part of the enclosure has at least two holes and is split between each of said holes and the peripheral edge of the new part, wherein the splits are of substantially the same length in a direction transverse to the axes of the cables so that the same mould can be used when sealing each split.

4. A method as claimed in claim 1, wherein the end wall of the enclosure has a circumferential wall integral with, and extending longitudinally from, its peripheral edge.

5. A method as claimed in claim 1, wherein the edges of the new part of the enclosure bounding each split are shaped to define a groove along the split.

6. A method as claimed in claim 1, wherein the end wall of the new part of the enclosure is of greater area than the original end wall of the enclosure which it replaces.

7. A method as claimed in claim 1, wherein a substantially rigid body is positioned againt the internal surface of the new part of the enclosure in the vicinity of the split to prevent collapse of the new part of the enclosure during the injection welding operation.

8. In a method as claimed in claim 1, in which each existing cable has a sheath of thermoplastics material, wherein the fluid-tight seal between each existing cable and the plastics sheathed cable and the new part of the enclosure are each effected by assembling about the cable adjacent a surface of the new part a mould which embraces the cable and has ports for the admission and discharge of molten thermoplastics material; temporarily sealing the mould to the new part; injecting into the interior of the mould through said admission port molten thermoplastics material that is compatible with the plastics material of the cable sheath and of the new part of the enclosure and that is at a temperature appreciably above the melting point of said materials; and, after a sufficient quantity of molten thermoplastics material has passed throught the mould and out of the discharge port to soften the surfaces of the cable sheath and of the new part of the enclosure, sealing the mould; and cooling the molten thermoplastics material in he mould and making an effective bond with the cable sheath and with the new part of the enclosure.

9. In a method as claimed in claim 1, in which the enclosure is divided transversely of the cable axes into at least three separately formed parts, wherein the enclosure is re-closed by forming at least one separately formed intermediate part of the enclosure by applying about the cables a sleeve which comprises a single tubular body split throughout its length or which is longitudinally divided into at least two separately formed bodies; causing at least one adjacent pair of longitudinal edges of the sleeve to lie close together; enclosing at least one pair of longtitudinal edges in a mould which has ports for the admission and discharge of molten thermoplastics material; injecting into the interior of the mould through at least one port molten thermoplastics material that is compatible with the plastics material of the sleeve and that is at a temperature appreciably above the softening point of said material and, after a sufficient quantity of molten thermoplastics material has passed through the mould and out of at least one other port of the mould to soften the surface of said longitudinal edges, sealing the mould; cooling the molten thermoplastics material in the mould and making an effective bond between said longitudinal edges of the sleeves and sealing the sleeve so formed to the adjacent separately formed parts of the enclosure.

10. A method as claimed in claim 1, wherein, after the mould enclosing the edges bounding the split in the new part of the enclosure has been sealed, the volume of the sealed space within the mould is reduced to compensate for contraction of the thermoplastics material on cooling.

11. A method as claimed in claim 10, wherein the volume of the sealed space within the mould is reduced by means of a plunger connected to at least one of the ports in the mould.

12. A method as claimed in claim 1, wherein the external surface of the end wall of the new part is of planar form.

13. A method as claimed in claim 8, wherein said planar external surface of the end wall of the new part lies in a plane that will be radial to the axis of a cable passing through the cable entry.

14. A method as claimed in claim 1, wherein the mould employed in sealing the or each split in the new part of the enclosure comprises a body which has a surface of a shape and configuration complementary to those of that part of the periphery of the new part of the enclosure adjacent the edges bounding the split and which has in said surface a groove that will overlie the edges bounding the split throughout the length of the new part when the mould is applied.

15. A method as claimed in claim 14, wherein the mould has two ports for the admission and discharge of molten thermoplastics material, one at each end of the groove.

16. In a method of making a connection between a plastics sheathed cable comprising at least one conductor and an existing cable termination of the kind in which the terminated end of a cable conductor is surrounded by an enclosure divided transversely of the axis of the cable into at least two separately formed parts secured together in a fluid-tight manner, at least one of said separately formed parts being of plastics material and including an end wall sealed in a fluid-tight manner to the plastics sheath of the cable protruding into the enclosure through a hole in said end wall, the steps comprising:
   a. opening up the enclosure to expose the existing conductor termination and removing at least said separately formed plastics part including and end wall;
   b. applying to the cable sheath at said end of the termination a new part of plastics material including an end wall which has at least one hole of a size appropriate to the cable at said end of the existing termination and which is split between said hole and the peripheral edge of said new part;
   c. passing a length of said plastics sheathed cable through a further hole in the end wall of said new part and connecting its conductor or conductors to at least one conductor of the cable of the existing termination;
   d. enclosing only said split and edge portions of said new part adjacent said split in a mould which has ports for the admission and discharge of molten thermoplastics material;
   e. injecting molten thermoplastics material into the interior of the mould through at least one port; which thermoplastics material is compatable with the plastics material of the new part of the enclosure and is at a temperature appreciably above the softening point of said material;
   f. after a sufficient quantity of molten thermoplastics material has passed through the mould and out of at least one other port of the mould to soften the surfaces of said edges, sealing the mould;
   g. cooling the molten thermoplastics material in the mould and making an effective bond between said edges of the new part;
   h. effecting fluid-tight seals between each cable and the end wall of said new part of the enclosure;
   i. and re-closing the enclosure.

* * * * *

UNITED STATES PATENT OFFICE
CERTIFICATE OF CORRECTION

Patent No. 4,064,216        Dated December 20, 1977

Inventor(s) DAVID TURNER PARR

It is certified that error appears in the above-identified patent and that said Letters Patent are hereby corrected as shown below:

Column 2, line 55, "shaped" should read --shape--.

Column 3, line 17, "surfae" should read --surface--.

Column 5, line 6, "iis" should read --is--.

Column 5, line 13, "noew" should read --now--.

Column 5, line 31, "and" should read --an--.

Column 5, line 41, "longtudinal" should read --longitudinal--.

Column 6, Claim 1, line 10, "and" should read --an--.

Column 6, Claim 1, line 34, "he" should read --the--.

Column 6, Claim 7, line 62, "againt" should read --against--.

Column 7, Claim 8, "he" should read --the--. (line 16)

Column 7, Claim 9, line 40, "making" should read --make--.

Column 7, Claim 10, line 44, "clain" should read --claim--.

UNITED STATES PATENT OFFICE
CERTIFICATE OF CORRECTION

Patent No. 4,064,216     Dated December 20, 1977

Inventor(s) DAVID TURNER PARR

It is certified that error appears in the above-identified patent and that said Letters Patent are hereby corrected as shown below:

Column 8, Claim 16, line 28, "and" should read -- an --.

Signed and Sealed this

Thirteenth Day of June 1978

[SEAL]

Attest:

RUTH C. MASON
*Attesting Officer*

DONALD W. BANNER
*Commissioner of Patents and Trademarks*